United States Patent

Marcocchio

[15] 3,688,506
[45] Sept. 5, 1972

[54] APPARATUS FOR REMOVING OIL SLICK FROM WATER SURFACES

[72] Inventor: Alphonso E. Marcocchio, 2239 S. Camden Ave., Los Angeles, Calif. 90064

[22] Filed: Dec. 28, 1970

[21] Appl. No.: 101,766

Related U.S. Application Data

[63] Continuation-in-part of Ser. No. 11,538, Feb. 16, 1970, abandoned.

[52] U.S. Cl. .....................................61/1 F, 210/242
[51] Int. Cl. .........................E02b 15/04, B01d 21/00
[58] Field of Search .......61/1 F, 5; 210/242, 210 SD, 210/121

[56] References Cited

UNITED STATES PATENTS

| 3,184,923 | 5/1965 | Galvaing | 61/1 F |
| 3,590,584 | 7/1971 | Fitzgerald | 61/1 F |
| 3,584,462 | 6/1971 | Gadd | 61/1 F |
| 3,219,190 | 11/1965 | Thune | 210/242 |

FOREIGN PATENTS OR APPLICATIONS

| 829,756 | 1960 | Great Britain | 61/1 F |
| 637,856 | 1936 | Germany | 61/1 F |

*Primary Examiner*—Jacob Shapiro
*Attorney*—Jessup & Beecher

[57] ABSTRACT

A barge-like float having a forward end shaped to be in skimming contact with the surface of the water. Two series of booms of special construction are attached to the forward end of the float, and the booms extend out from the barge in substantially an inverted V formation. The booms are intercoupled with one another in a particular manner, so that the booms may ride ocean swells without turning over, and without permitting the oil slick to seep under the booms.

8 Claims, 8 Drawing Figures

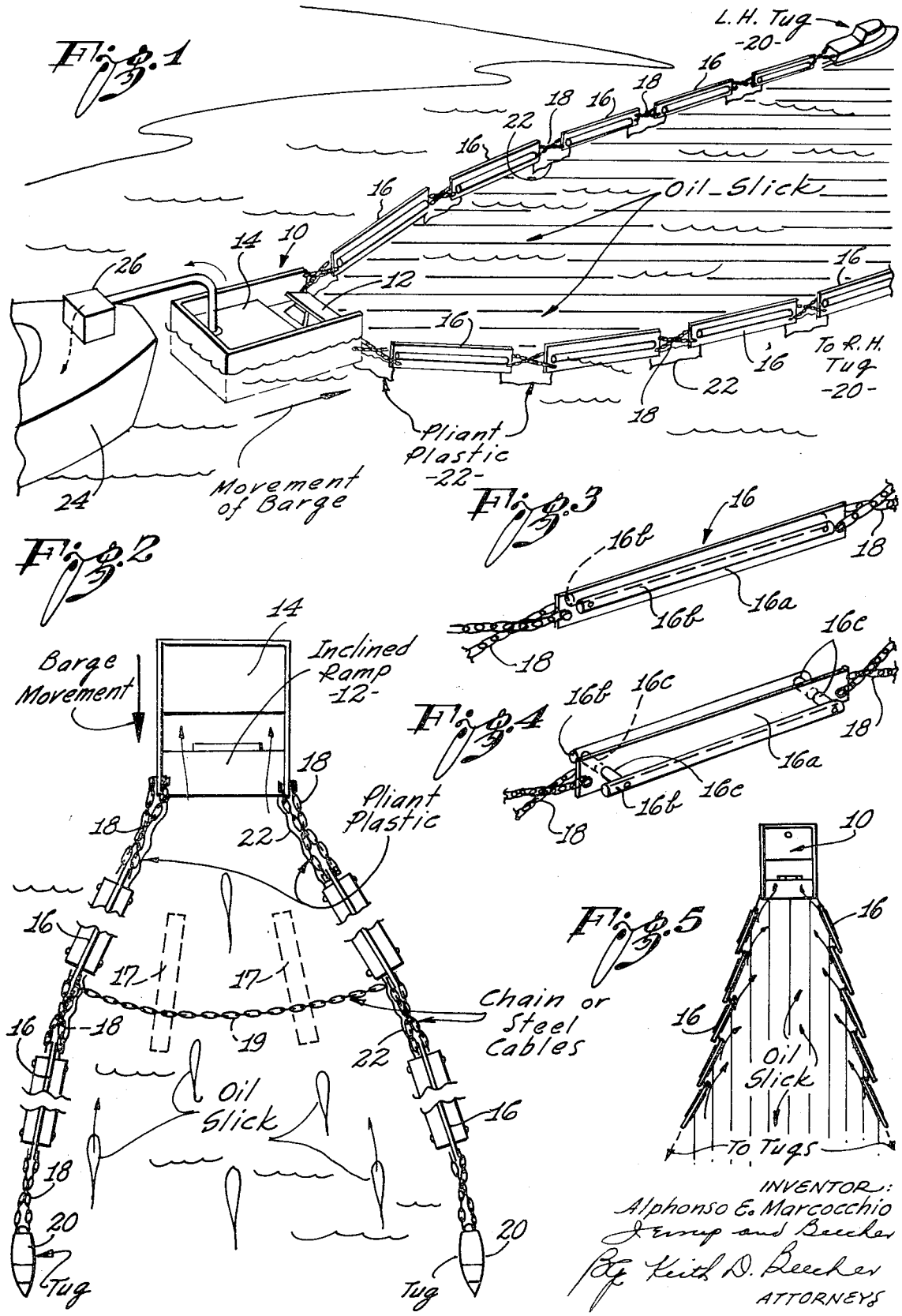

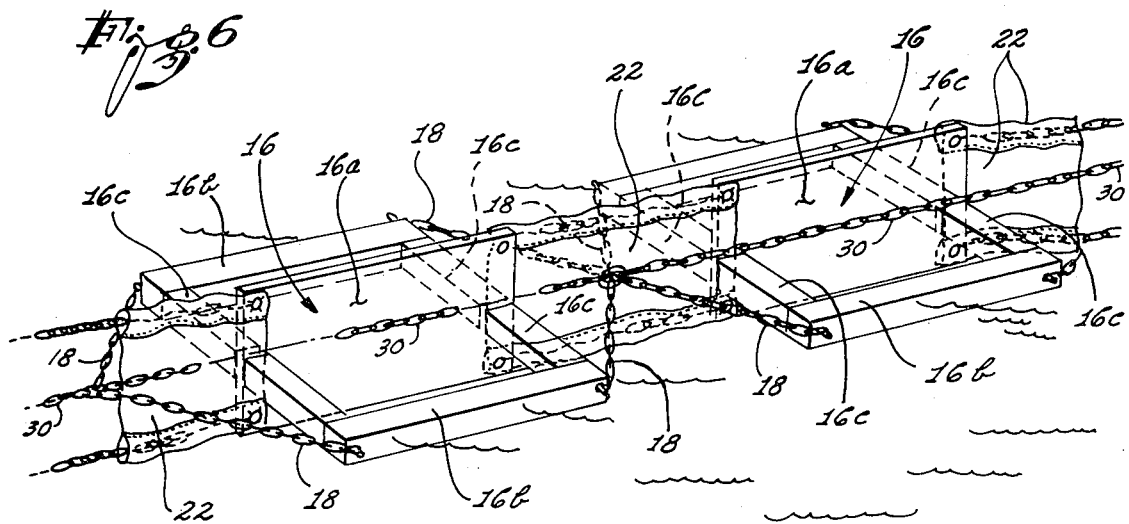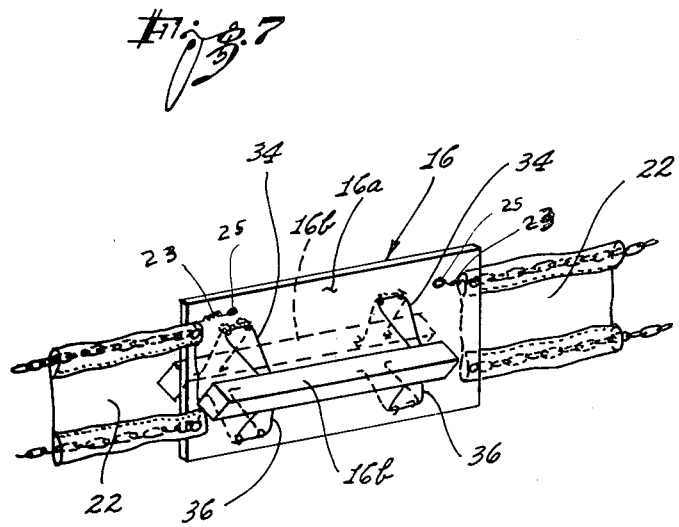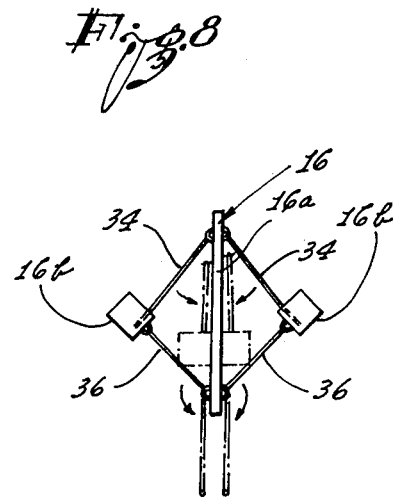

APPARATUS FOR REMOVING OIL SLICK FROM WATER SURFACES

The present application is a continuation-in-part of copending application Ser. No. 11,538, filed Feb. 16, 1970, in the name of Alphonso E. Marcocchio and now abandoned.

BACKGROUND OF THE INVENTION

It is a frequent occurrence in off-short oil drilling operations for leaks to develop in the ocean bottom, and for oil to be spewed up to the surface and subsequently to be drawn into the adjacent beaches, despoiling the beaches and killing marine and other wild life. It is also a frequent occurrence in the vicinity of oil producing and refining apparatus for substantial quantities of oil to collect in adjacent bodies of water and streams, so as to create oil pollution in the streams and in the larger bodies of water into which the streams flow.

There does not appear to be any system or apparatus in the prior art for successfully collecting the oil from the surface of the body of water before it has an opportunity to damage the surrounding environment. The most common expedient at present is to spread straw on the oil surface and fouled areas. The oil has a tendency to be absorbed and soak into the straw, and the resulting mess may be subsequently burned, or otherwise disposed of, with resulting wastage of the oil itself. This method is slow, painstaking and expensive, and it is at best a clean-up operation rather than a preventative method.

Other techniques have been attempted in the prior art, but none has met with any measure of success, for one reason or another. These latter prior art techniques include, for example, attempts to rig tents and funnels over the underwater leaks, attempts to use suction devices to draw the oil from the surface of the water, attempts to set up guides to direct the oil along particular channels, and so on.

The improved apparatus of the invention is provided for removing oil slick from the surfaces of lakes, rivers, streams, oceans, and other bodies of water. This is accomplished before the oil is washed ashore, and before it has a chance to damage shorelines, wildlife, foliage, watercraft, and the like.

An important feature of the apparatus of the present invention is that it may be used conveniently and expeditiously as a preventive measure; in that it serves to collect the oil from the surface of the body of water, before the oil has had an opportunity to spread and create damage. The apparatus of the invention has the advantage in that it has the capability not only of removing the oil slick from the water surface in a simple manner, but also in that it renders the collected oil readily available for reclaiming purposes.

The apparatus of the invention also has an advantage in that it is eminently simple and inexpensive to construct, and units may easily be dispatched from location to location, by air or other means. The apparatus of the invention is easy to store, and it may quickly be brought into operation. The operation of the apparatus requires comparatively little labor, and no particular skill apart from the ability, for example, to handle tug boats. In fact, the tug boats themselves may be dispensed with in cases where the oil slick is moving in the current of a stream, or along a tidal current, for example, and in such cases the apparatus of the invention may be anchored in the stream in position such that the oil slick is directed and flows into the apparatus, as will be described.

As mentioned above, the apparatus of the invention comprises essentially a barge-like float, and two series of booms extending substantially as an inverted V outwardly from the forward end of the float. The booms serve to guide the oil slick towards the forward end of the float, upon relative movement between the apparatus and the water surface. This relative movement may be achieved, for example, by towing the apparatus by means of tug boats, or the like, secured to each end of each series of booms, or by anchoring the ends of the two series of booms to hold the apparatus stationary in a current or tidal flow of the body of water. It is a simple matter to separate the oil from the water once it has been drawn into the float, and this may be achieved by either providing a weir arrangement, as will be described, or by a centrifugal pumping mechanism. The reclaimed oil may be pumped into an adjacent oil barge, or other reservoir, for subsequent normal use.

A particular problem with apparatus of the type described above, and especially in removing oil slick from the ocean, or other large body of water where swells occur, is of maintaining the booms upright, and of assuring that the oil gathered between the booms will not seep under them and escape. The booms in the apparatus of the present invention each comprise an upright wall member, and a pair of elongated float members attached to each side of the upright wall member and spaced outwardly therefrom so as to assure that the upright member will be held in its upright position even in the presence of large ocean swells. The upright member itself is supported in a manner such that it extends down into the water a sufficient distance, so that when the oil is drawn between the two series of booms, and is caused to extend down into the water an appreciable depth, it still will not escape under the upright wall member. Also, as will be described, the individual booms are lashed together in a way such that the booms are individually free to ride the ocean swells and waves without losing the integrity of the overall apparatus, and without permitting oil to escape from under or between the booms.

STATEMENT OF THE INVENTION

Apparatus for removing oil slick from the surface of a body of water comprising a skimmer barge-like float, having a forward end configured to be in skimming relationship with the surface of the water, and two series of booms extending outwardly substantially in an inverted V formation from the forward end of the float for directing the oil slick toward the forward end and into the float, each of the booms of the series comprising an upright member, and a pair of elongated float members attached to each side of said upright member and spaced outwardly therefrom so as to maintain said upright member in an upright condition, and which includes individual chains intercoupling adjacent booms in a manner to permit the booms to ride freely and individually on the waves.

BRIEF DESCRIPTION OF THE DRAWINGS

FIG. 1 is a perspective representation of apparatus constructed in accordance with one embodiment of the invention;

FIG. 2 is a plan view of the apparatus of FIG. 1, and illustrating additional structure which may be used in the apparatus;

FIG. 3 is a perspective representation of one of the boom members used in the apparatus of FIGS. 1 and 2;

FIG. 4 is a perspective representation of a second embodiment of the boom member used in the apparatus of FIGS. 1 and 2;

FIG. 5 is a representation of modified apparatus, by which the individual booms are supported in an overlapping relationship;

FIG. 6 is a perspective partial representation of a further embodiment of the apparatus of the invention;

FIG. 7 is a side perspective representation of yet a further embodiment; and

FIG. 8 is an end view of the embodiment of FIG. 7.

DETAILED DESCRIPTION OF THE ILLUSTRATED EMBODIMENTS

As shown in FIG. 1, the apparatus of the invention includes a barge-like float 10. The float 10 in the illustrated embodiment is constructed to have a generally rectangular configuration, and to have upstanding side walls and an upstanding rear wall. The forward end of the float 10 is open, and a foreshortened wall member 12 extends across the open end of the float. The wall member 12 is inclined as a ramp, and it provides a weir effect, so that when the float 10 is towed through an oil slick, the oil flows up and over the weir and into the float with a minimum amount of water. The wall member 12 is preferably adjustable, so that it may be shifted down into the water to just below the level of the oil slick gathered at the front of the barge.

Therefore, when the float 10 is towed through the water, there is a tendency for the float to fill with oil derived from the oil slick on the surface of the water. An adjacent barge 24 may be provided, for example, equipped with a pump 26. The pump 26 serves to pump the oil from the float 10 into the barge 24. It will be appreciated that the intake to the pump 26 may be located at a position in the float 10, for example, directly under a raised platform 14, so that a maximum amount of oil and a minimum amount of water will be pumped from the float 10 into the barge 24. The platform 14 serves to retain the oil in the barge 10 and to prevent the oil from splashing over the sides of the barge.

An additional pump (not shown) may be provided on the float 10 having an intake extending to the bottom of the float, and which serves to pump sea water out of the float and return it to the body of water, preferably in front of the float to assure that any oil inadvertently pumped by the pump will not escape. As an alternative, the pump 26 may remove water and oil from the float 10, and the mixture may then be subjected to a centrifugal, or other operation, within the barge 10, so as to separate the oil from the water. In such an event, the oil will be recovered and stored in the barge 24, for example, and the water returned.

Also included in the apparatus of the invention is a first series of booms 16 which are attached to one another by appropriate fasteners such as crossed anchor chains or cables 18, and which are attached to one side of the open forward end of the float 10 in the same manner. The apparatus also includes a second series of booms 16 which, likewise, are attached to one another by crossed anchor chains or cables 18, and which extend from the other side of the forward end of the float. The two series of booms extend in a generally V configuration from the forward end, and may be attached to appropriate tug boats 20.

The tug boats serve to draw the booms 16, as well as the float 10 across the surface of the body of water on which the oil slick occurs, with the booms forming a general V configuration and surrounding the oil slick. As the apparatus is towed, the oil slick is directed into the forward end of the float 10, and over the wall 12 into the interior of the float. It will be appreciated that as the oil slick is gathered together and directed towards the open end of the float 10, it extends further and further down into the water, and care must be taken that the oil will not seep down under the booms 16 and escape.

The spaces between the individual booms 16 may be blocked, for example, by sheets of pliant plastic material, or by other appropriate means, designated 22. Conversely, and as shown in FIG. 5, for example, the booms may be lashed together in an overlapping relationship so that there is no need to provide the sheets 22 between the successive booms. When these pliant sheets 22 are used, they are preferably attached to the ends of the corresponding booms. Also, the corresponding crossed chains 18 must be such that the booms are held sufficiently close together so that the pliant plastic material 22 is not taut. This is important, since when the apparatus is drawn over crests of waves, it is important that the individual booms may rise and fall with the waves, and also so that adjacent pairs may form an apex with one another as the apparatus is drawn over the crest of the wave, without damaging the apparatus, and without interfering with the integrity of the boom and pliant plastic structure.

It is preferred that a transverse chain 19 be provided, as shown in FIG. 2, to limit the spread of the booms in the two side series. Other booms designated 17 are lashed to the chain 19 to reduce turbulence with the boom and to facilitate the flow of the oil slick into the float 14.

As shown in FIG. 3, for example each boom 16 comprises an upright wall 16a, and a pair of float members 16b secured to either side of the wall 16a, so as to hold the wall in an upright position. As shown in FIG. 5, it is preferable for the float members 16b to be spaced outwardly from the wall 16a by appropriate spacers 16c to provide an outrigger effect and to increase the stability of the boom. With the construction shown in FIG. 4, for example, the boom is capable of riding over relatively high swells without any tendency for the boom to turn over on its side.

In order for the apparatus to operate efficiently, the booms 16 should be approximately 8 to 12 feet long, and approximately 5 feet wide. The float members 16b are positioned, so that preferably about 3 feet of the upright member 16 extends below the water and about 2 feet above the water. It has been found for most purposes, that when the upright members extend three feet below the water, there is no tendency for the oil slick to seep down under the booms, and the apparatus operates efficiently.

It will be appreciated that if so desired, the tug boats 20 may be used merely to haul the apparatus out into the stream in which the oil slick is flowing, and the remote ends of the booms 16 may be anchored in the stream so that the oil will flow between the series of booms and into the float 10.

The apparatus shown in FIG. 6 uses a boom construction similar to that shown in FIG. 4, and like elements have been designated by the same numbers. In the embodiment of FIG. 6, an additional chain 30 extends along each series of booms, and is attached to the crossed chains 18 at their cross-over points. The central chain 30 extends along the water line and it serves to maintain the individual booms sufficiently close to one another so that the intervening plastic strips 22 or other waterproof flexible strips, are maintained in a slack condition. The central chain 30 serves to remove all tension from the top and bottom of the individual strips 22 so that the strips are maintained in slack condition to permit free movement of the booms individually on the surface of the body of water, as the apparatus is towed across the surface, and in the presence of relatively large swells and waves on the surface.

When the individual booms are supported in the manner shown in FIG. 6, and as explained briefly above, they are able to move with the water surface and to assume individual inclined positions relative to one another, so that at all times not only are the booms maintained in a stable, upright condition, but also they are free to move with the water and yet maintain a uniform impervious wall to the oil slick constrained between the two series of booms.

The embodiment of FIGS. 7 and 8 is generally similar to the embodiment of FIG. 4, and again like components have been designated by the same numerals. The embodiment of FIGS. 7 and 8 utilizes a boom construction such as shown in FIG. 4, and the booms are intercoupled with one another in the illustrated manner. In the latter embodiment, the float members 16b are secured to the central wall 16a by clips 34 and 36. The clip 36 may be detached from hooks on the central panel 16 to permit the float members to be suspended freely against the sides of the panel 16 by the clip 34 to conserve space during shipment of the booms, by aircraft or other vehicle to the site of oil spillage. The clips 34 and 36 may be arranged so that the float member on one side of the boom may be turned up, and the float on the other side moved down, when the equipment is stored, in order to reduce the overall thickness of the assembly as much as possible, as the booms are stored adjacent one another in an accordion-like manner for rapid deployment. In fact, the equipment may be carried by the oil tankers, or oil platforms, themselves in readiness to be deployed in the event of oil spillage. When so carried, the booms may be folded against one another in an accordion-like manner, as suggested above, for rapid deployment when needed.

As shown in FIG. 7, the plastic strips 22 may be secured to the booms 16 by bolts or pins 25, and through resilient members, such as the springs 23. In this way the upper edges of the strip 22 are held taut even though the particular boom is down in the trough of a wave. Reinforcing ribs, or other means may be used in conjunction with the strip 22 to help maintain the strips in an upright position at all times.

While particular embodiments of the invention have been shown and described, it is evident that modifications of the invention may be made. The following claims are intended to cover all modifications which fall within the spirit and scope of the invention.

What is claimed is:

1. Apparatus for removing oil slick from the surface of a body of water comprising: a barge-like float including a forward end configured to permit oil from the surface of the water to flow into the interior of the float upon relative movement between the float and the body of water; a first series of booms; means securing said booms of said first series to one another and to said float in a manner to permit relative transverse movement between the successive booms of said first series and between the booms of said first series and said float; a second series of booms; means securing said booms of said second series to one another and to said float in a manner to permit relative transverse movement between the successive booms of said second series, and between the booms of said second series and said float; the aforesaid securing means including chain means securing said booms of each of said series to one another and to said barge-like float so as to permit individual up and down movements of said booms relative to one another, and so as to permit adjacent booms to assume an angular relationship with one another as said booms are drawn over the crest of a wave or swell on the surface of said body of water; said booms of said first and second series being capable of floating on a body of water and defining substantially an inverted V formation with respect to the forward end of said barge-like float to direct the water and oil slick towards said forward end of said float; each of said booms including an upright wall member, a pair of float members, and means mounting said float members to the opposite sides of said upright wall member and spaced outwardly from the plane of said wall member by a predetermined amount, so as to support said wall member in an upright position with stability and so as to permit said upright wall member to extend down below the surface of said body of water a predetermined amount, and including an upright sheet of flexible material interposed between successive booms in each of said series so as to block the spaces therebetween, said sheet having upper and lower edges secured to the upper and lower edges of respective ones of said upright wall members of such successive booms, said securing means holding adjacent booms sufficiently close together so as to maintain the corresponding sheet of flexible material in a slack condition and permit free individual up and down movement of said booms so as to permit adjacent booms to assume an angular relationship to one another.

2. The combination defined in claim 1, in which said wall member has a length lying in a range substantially extending between 8 and 12 feet, and a width of the order of 5 feet, and in which said float members are mounted on the opposite sides of said upright wall member so as to permit said upright wall member to extend at least approximately 2 feet below the surface of said body of water.

3. The apparatus defined in claim 1, in which said barge-like float has side walls and a rear wall and an open forward end, and which includes a foreshortened forward wall member extending across said open forward end and providing a weir effect whereby oil flows over the top of said forward wall member and into the float.

4. The apparatus defined in claim 3, in which said forward wall member is inclined towards the rear of said float to form a ramp.

5. The apparatus defined in claim 1, and which includes a powered water vehicle attached to the end of each of said series of booms to tow the booms and the barge-like float across the surface of the body of water.

6. The apparatus defined in claim 1, and which includes cable means extending transversely from one of said series of booms to the other, and which includes further booms supported by said last-named cable means to reduce turbulence in the oil slick gathered between said first and second series of booms.

7. The apparatus defined in claim 1, in which said chain means comprises a pair of crossed chains extending between adjacent ones of said booms of each of said series.

8. The apparatus defined in claim 7, and which includes chain means extending the length of said booms of said first and second series and secured to the crossover points of respective ones of said crossed chains to assist in maintaining the aforesaid sheet of flexible material in a slack condition.

* * * * *